United States Patent
Bunderson et al.

(10) Patent No.: US 12,552,413 B2
(45) Date of Patent: Feb. 17, 2026

(54) AUTO-TUNABLE PATH CONTROLLER WITH DYNAMIC AVOIDANCE CAPABILITY

(71) Applicant: Autonomous Solutions, Inc., Mendon, UT (US)

(72) Inventors: Nate Bunderson, Mendon, UT (US); Jeff Ferrin, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 149 days.

(21) Appl. No.: 18/488,016

(22) Filed: Oct. 16, 2023

(65) Prior Publication Data

US 2024/0124024 A1    Apr. 18, 2024

Related U.S. Application Data

(60) Provisional application No. 63/416,477, filed on Oct. 14, 2022.

(51) Int. Cl.
| | |
|---|---|
| *B60W 60/00* | (2020.01) |
| *B60W 30/09* | (2012.01) |
| *G01C 21/34* | (2006.01) |
| *B60W 30/12* | (2020.01) |

(52) U.S. Cl.
CPC ........ *B60W 60/0015* (2020.02); *B60W 30/09* (2013.01); *G01C 21/34* (2013.01); *B60W 30/12* (2013.01); *B60W 2710/20* (2013.01)

(58) Field of Classification Search
CPC .. B60W 60/0015; B60W 30/09; B60W 30/12; B60W 2710/20; G01C 21/34; G01C 21/3415
See application file for complete search history.

(56) References Cited

U.S. PATENT DOCUMENTS

| | | | |
|---|---|---|---|
| 10,251,329 B2* | 4/2019 | Foster | G05D 1/0219 |
| 2015/0346723 A1 | 12/2015 | Pedersen | |
| 2017/0308091 A1 | 10/2017 | Bunderson et al. | |
| 2018/0059682 A1 | 3/2018 | Thode | |
| 2019/0141878 A1* | 5/2019 | Foster | G05D 1/0217 |
| | | | 701/26 |
| 2021/0339768 A1 | 11/2021 | Kakkar et al. | |
| 2022/0073101 A1* | 3/2022 | Wang | B62D 15/0285 |

OTHER PUBLICATIONS

International Search Report and Written Opinion for PCT application No. PCT/US2023/077037, mailed on Feb. 14, 2024, 8 pages.

* cited by examiner

*Primary Examiner* — Jason Holloway

(57) ABSTRACT

A path control systems and methods are disclosed that can aide in keeping an autonomous vehicle on a path. A current estimate of the autonomous vehicle's first position (x, y), heading, and velocity as well as a path of interest (e.g., breadcrumbs, line-arcs, or clothoid segments each containing velocity information) can be used to output a command velocity, command curvature, and/or a vector of waypoints. The command velocity, command curvature, and/or a vector of waypoints can be followed to move the autonomous vehicle from the first position onto the path of interest. An obstacle map may also be used to provide a path to the path of interest that avoids the obstacles on the obstacle map.

18 Claims, 11 Drawing Sheets

AUTO-TUNABLE PATH CONTROLLER WITH DYNAMIC AVOIDANCE CAPABILITY

BACKGROUND

Path planning can be useful for autonomous vehicle. A path, for example, may include a plurality of waypoints within an environmental space along with a plurality of speed values that can be used by the autonomous vehicle to move from point A to point B. A path may be created for any number of reasons. For instance, a path may be created that avoids obstacles, obstructions, other paths, etc. A path may be created, for example, to move the autonomous vehicle from point A to a proposed path.

SUMMARY

A method for planning the path of an autonomous vehicle is disclosed. The method, for example, may include receiving a first position, initial velocity, and/or yaw of the autonomous vehicle; receiving a target path along which the autonomous vehicle is expected to drive; trimming the target path based on the first position of the autonomous vehicle; calculating a target path length; planning a modified target path based on the target path and the target path length; creating one or more graft paths from the first position to the modified target path; optimizing the one or more graft paths to produce a single graft path; determining a length rate of curvature from the single graft path; determining a command steer angle from the graft path; determining command velocity from the graft path; and outputting the command steer angle and the command velocity.

The command steer angle, for example, may include a steer angle determined from a tangent of the graft path initial curvature times a wheelbase of the autonomous vehicle. The command steer angle, for example, may include a last calculated command steer angle. The command velocity, for example, may be less than a max steering rate of the autonomous vehicle. The command velocity, for example, may be less than a predetermined avoidance speed. The length rate of curvature, for example, may be determined from the maximum of the current speed times.

An autonomous vehicle is disclosed that includes a sensor array; an engine output control system; a braking control system; a steering control system, a communication system; and a controller. The controller, for example, may be communicatively coupled with the sensor array, the engine output control system, the transmission control system, the steering control system, and the braking control system. The controller may retrieve a first position, initial velocity, and/or yaw of the autonomous vehicle from the sensor array; receive a target path for the autonomous vehicle; trim the target path based on the first position of the autonomous vehicle; calculate a target path length along which the autonomous vehicle is expected to drive; plan a modified target path based on the target path and the target path length; create one or more graft paths from the first position to the modified target path; optimize the one or more graft paths to produce a single graft path; determine a length rate of curvature from the single graft path; determine a command steer angle from the graft path; determine command velocity from the graft path; output the command steer angle to the steering control system; and output the command velocity to the engine control system and/or the braking control system.

The command steer angle, for example, may include a steer angle determined from a tangent of the graft path initial curvature times a wheelbase of the autonomous vehicle. The command steer angle, for example, may include a last calculated command steer angle. The command velocity, for example, may be less than a max steering rate of the autonomous vehicle. The command velocity, for example, may be less than a predetermined avoidance speed. The length rate of curvature, for example, may be determined from the maximum of the current speed times.

A computer-readable recording medium storing instructions for executing a method for planning the path of an autonomous vehicle is disclosed. The method, for example, may include receiving a first position, initial velocity, and/or yaw of the autonomous vehicle; receiving a target path along which the autonomous vehicle is expected to drive; trimming the target path based on the first position of the autonomous vehicle; calculating a target path length; planning a modified target path based on the target path and the target path length; creating one or more graft paths from the first position to the modified target path; optimizing the one or more graft paths to produce a single graft path; determining a length rate of curvature from the single graft path; determining a command steer angle from the graft path; determining command velocity from the graft path; and outputting the command steer angle and the command velocity.

The command steer angle, for example, may include a steer angle determined from a tangent of the graft path initial curvature times a wheelbase of the autonomous vehicle. The command steer angle, for example, may include a last calculated command steer angle. The command velocity, for example, may be less than a max steering rate of the autonomous vehicle. The command velocity, for example, may be less than a predetermined avoidance speed. The length rate of curvature, for example, may be determined from the maximum of the current speed times.

The various examples described in the summary and this document are provided not to limit or define the disclosure or the scope of the claims.

DETAILED DESCRIPTION

A path control systems and methods are disclosed that can aide in keeping an autonomous vehicle on a path. A current estimate of the autonomous vehicle's first position (x, y), heading, and velocity as well as a path of interest (e.g., breadcrumbs, line-arcs, or clothoid segments each containing velocity information) can be used to output a command velocity, command curvature, and/or a vector of waypoints. The command velocity, command curvature, and/or a vector of waypoints can be followed to move the autonomous vehicle from the first position onto the path of interest. An obstacle map may also be used to provide a path to the path of interest that avoids the obstacles on the obstacle map.

The various control systems or methods, for example, may be drivable by an autonomous vehicle. The various control systems or methods, for example, may use a model of the autonomous vehicle to predict the autonomous vehicle's response to curvature commands so that the appropriate commands can be generated to allow the vehicle to more closely follow the graft path. The various control systems or methods, for example, may produce a graft path that can avoid dynamic obstacles.

Figure 1:
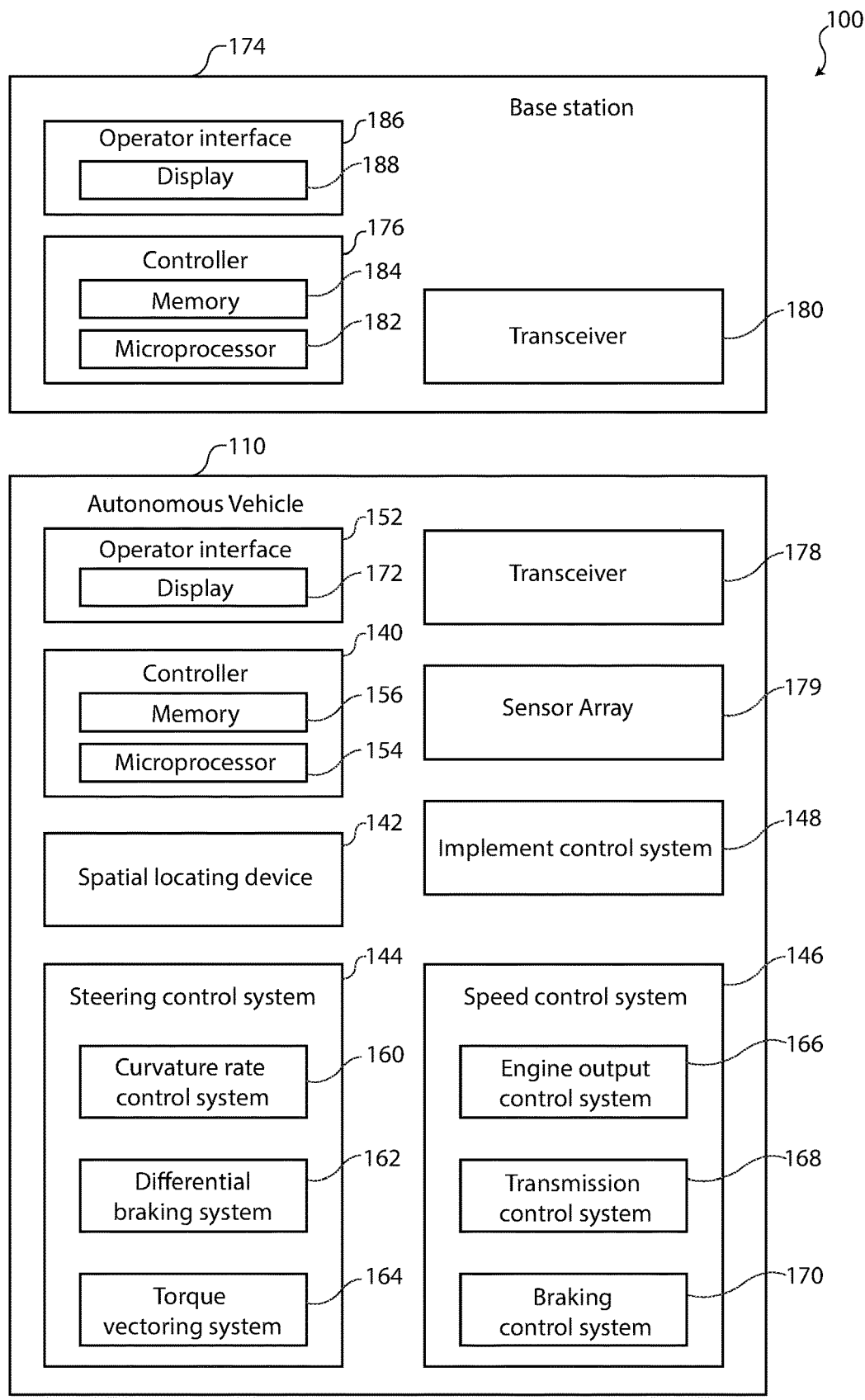
FIG. 1 is a block diagram of a communication and control system.

FIG. 1 is a block diagram of a communication and control system 100. The communication and control system 100, for example, may include an autonomous vehicle 110 in communication with 174//. The autonomous vehicle 110, for example, may include an automobile, a truck, a van, an electric vehicle, a combustion vehicle, a loader, wheel loader, a track loader, a dump truck, a digger, a backhoe, a forklift, etc. Various components of the communication and control system 100, for example, may include any or all components of computational system 1100 shown in FIG. 11.

The autonomous vehicle 110, for example, may include a steering control system 144 that may control a direction of movement of the autonomous vehicle 110. The steering control system 144, for example, may include any or all components of computational system 1100 shown in FIG. 11.

The autonomous vehicle 110, for example, may include a speed control system 146 that controls a speed of the autonomous vehicle 110. The autonomous vehicle 110, for example, may include an implement control system 148 that may control operation of an implement coupled with or towed by the autonomous vehicle 110 or integrated within the autonomous vehicle 110. The implement control system 148, for example, may include any type of implement such as, for example, a bucket, a shovel, a blade, a thumb, a dump bed, a plow, an auger, a trencher, a scraper, a broom, a hammer, a grapple, forks, boom, spears, a cutter, a wrist, a tiller, a rake, etc. The speed control system 146, for example, may include any or all components of computational system 1100 shown in FIG. 11.

The control system 140, for example, may include a controller 150 communicatively coupled to the steering control system 144, to the speed control system 146, and the implement control system 148. The control system 140, for example, may be integrated into a single control system. The control system 140, for example, may include a plurality of distinct control systems. The control system 140, for example, may include any or all the components show in FIG. 11.

The controller 150, for example, may receive signals relative to many parameters of interest including, but not limited to: vehicle position, vehicle speed, vehicle heading, desired path location, off-path normal error, desired off-path normal error, heading error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

The controller 150, for example, may be an electronic controller with electrical circuitry configured to process data from the various components of the autonomous vehicle 110. The controller 150 may include a processor, such as the processor 154, and a memory device 156. The controller 150 may also include one or more storage devices and/or other suitable components (not shown). The processor 154 may be used to execute software, such as software for calculating drivable path plans. Moreover, the processor 154 may include multiple microprocessors, one or more "general-purpose" microprocessors, one or more special-purpose microprocessors, and/or one or more application specific integrated circuits (ASICS), or any combination thereof. For example, the processor 154 may include one or more reduced instruction set (RISC) processors. The controller 150, for example, may include any or all the components show in FIG. 11.

The controller 150 may be in communication with a spatial locating device 142 such as, for example, a GPS device. The spatial locating device 142 may provide geolocation data to the controller 150.

The memory device 156, for example, may include a volatile memory, such as random access memory (RAM), and/or a nonvolatile memory, such as ROM. The memory device 156 may store a variety of information and may be used for various purposes. For example, the memory device 156 may store processor-executable instructions (e.g., firmware or software) for the processor 154 to execute, such as instructions for calculating drivable path plan, and/or controlling the autonomous vehicle 110. The memory device 156 may include flash memory, one or more hard drives, or any other suitable optical, magnetic, or solid-state storage medium, or a combination thereof. The memory device 156 may store data such as field maps, maps of desired paths, vehicle characteristics, software or firmware instructions and/or any other suitable data.

The steering control system 144, for example, may include a curvature rate control system 160, a differential braking system 162, a steering mechanism, and a torque vectoring system 164 that may be used to steer the autonomous vehicle 110. The curvature rate control system 160, for example, may control a direction of an autonomous vehicle 110 by controlling a steering control system of the autonomous vehicle 110 with a curvature rate, such as an Ackerman style autonomous loader, 110 or articulating loader. The curvature rate control system 160, for example, may automatically rotate one or more wheels or tracks of the autonomous vehicle 110 via hydraulic or electric actuators to steer the autonomous vehicle 110. By way of example, the curvature rate control system 160 may rotate front wheels/tracks, rear wheels/tracks, and/or intermediate wheels/tracks of the autonomous vehicle 110 or articulate the frame of the loader, either individually or in groups. The differential braking system 162 may independently vary the braking force on each lateral side of the autonomous vehicle 110 to direct the autonomous vehicle 110. Similarly, the torque vectoring system 164 may differentially apply torque from the engine to the wheels and/or tracks on each lateral side of the autonomous vehicle 110. While the steering control system 144 includes the curvature rate control system 160, the differential braking system 162, and/or the torque vectoring system 164. A steering control system 144, for example, may include other and/or additional systems to facilitate turning the autonomous vehicle 110 such as an articulated steering control system, a differential drive system, and the like.

The speed control system 146, for example, may include an engine output control system 166, a transmission control system 168, and a braking control system 170. The engine output control system 166 may vary the output of the engine to control the speed of the autonomous vehicle 110. For example, the engine output control system 166 may vary a throttle setting of the engine, a fuel/air mixture of the engine, a timing of the engine, and/or other suitable engine parameters to control engine output. In addition, the transmission control system 168 may adjust gear selection within a transmission to control the speed of the autonomous vehicle 110. Furthermore, the braking control system 170 may adjust braking force to control the speed of the autonomous vehicle 110. While the illustrated speed control system 146 includes the engine output control system 166, the transmission control system 168, and/or the braking control system 170. A speed control system 146, for example, having other and/or additional systems to facilitate adjusting the speed of the autonomous vehicle 110 may be included.

The implement control system 148, for example, may control various parameters of the implement towed by and/or integrated within the autonomous vehicle 110. For example, the implement control system 148 may instruct an implement controller via a communication link, such as a CAN bus, ISOBUS, Ethernet, wireless communications, and/or Broad R Reach type Automotive Ethernet, etc.

The implement control system 148, for example, may instruct an implement controller to adjust a penetration depth of at least one ground engaging tool of an agricultural implement, which may reduce the draft load on the autonomous vehicle 110.

The implement control system 148, as another example, may instruct the implement controller to transition an agricultural implement between a working position and a transport portion, to adjust a flow rate of product from the agricultural implement, to adjust a position of a header of the agricultural implement (e.g., a harvester, etc.), among other operations, etc.

The implement control system 148, as another example, may instruct the implement controller to adjust a shovel height, a shovel angle, a shovel position, etc.

The implement control system 148, as another example, may instruct the implement controller to adjust a shovel height, a shovel angle, a shovel position, etc.

The controller 150, for example, may be coupled with a sensor array 179. The sensor array 179, for example, may facilitate determination of condition(s) of the autonomous vehicle 110 and/or the work area. For example, the sensor array 179 may include one or more sensors (e.g., infrared sensors, ultrasonic sensor, magnetic sensors, radar sensors, Lidar sensors, terahertz sensors, sonar sensors, cameras, etc.) that monitor a rotation rate of a respective wheel or track and/or a ground speed of the autonomous vehicle 110. The sensors may also monitor operating levels (e.g., temperature, fuel level, etc.) of the autonomous vehicle 110. Furthermore, the sensors may monitor conditions in and around the work area, such as temperature, weather, wind speed, humidity, and other conditions. The sensors, for example, may detect physical objects in the work area, such as the parking stall, the material stall, accessories, other vehicles, other obstacles, or other object(s) that may in the area surrounding the autonomous vehicle 110. Further, the sensor array 179 may be utilized by the first obstacle avoidance system, the second obstacle avoidance system, or both.

The operator interface 152, for example, may be communicatively coupled to the controller 150 and configured to present data from the autonomous vehicle 110 via a display 172. Display data may include data associated with operation of the autonomous vehicle 110, data associated with operation of an implement, a position of the autonomous vehicle 110, a speed of the autonomous vehicle 110, a desired path, a drivable path plan, a target position, a first position, etc. The operator interface 152 may enable an operator to control certain functions of the autonomous vehicle 110 such as starting and stopping the autonomous vehicle 110, inputting a desired path, etc. The operator interface 152, for example, may enable the operator to input parameters that cause the controller 150 to adjust the drivable path plan. For example, the operator may provide an input requesting that the desired path be acquired as quickly as possible, that an off-path normal error be minimized, that a speed of the autonomous vehicle 110 remain within certain limits, that a lateral acceleration experienced by the autonomous vehicle 110 remain within certain limits, etc. In addition, the operator interface 152 (e.g., via the display 172, or via an audio system (not shown), etc.) may alert an operator if the desired path cannot be achieved, for example.

The control system 140, for example, may include a base station 174 having a base station controller 176 located remotely from the autonomous vehicle 110. For example, control functions of the control system 140 may be distributed between the controller 150 of the control system 140 and the base station controller 176. The base station controller 176, for example, may perform a substantial portion of the control functions of the control system 140. For example, a first transceiver 178 positioned on the autonomous vehicle 110 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 180 at the base station 174. The base station controller 176, for example, may calculate drivable path plans and/or output control signals to control the curvature rate control system 160, the speed control system 146, and/or the implement control system 148 to direct the autonomous vehicle 110 toward the desired path, for example. The base station controller 176 may include a processor 182 and memory device 184 having similar features and/or capabilities as the processor 154 and the memory device 156 discussed previously. Likewise, the base station 174 may include an operator interface 186 having a display 188, which may have similar features and/or capabilities as the operator interface 152 and the display 172 discussed previously.

Figure 2:
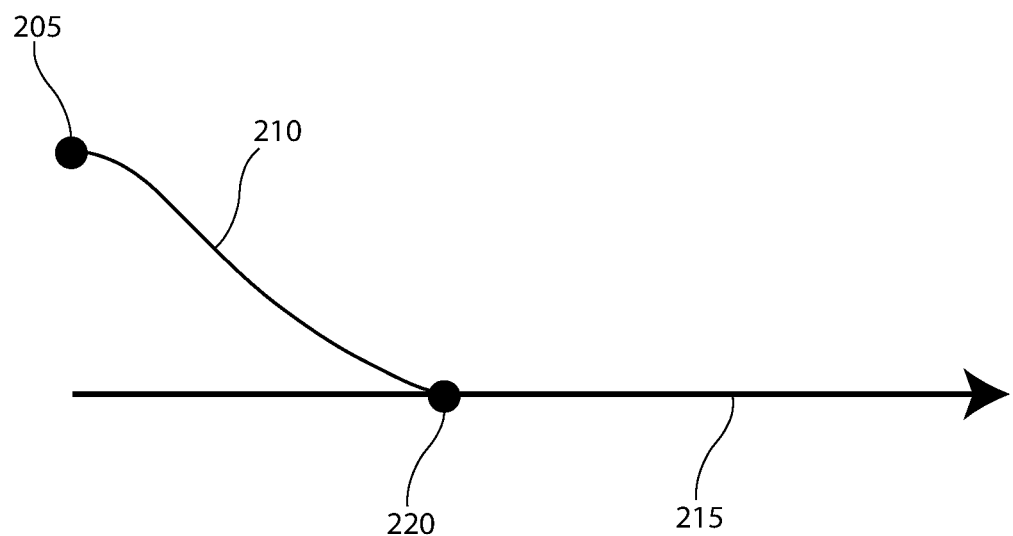
FIG. 2 is an illustration of an autonomous vehicle at point that is not on the path according to the disclosed methods and systems.

FIG. 2 shows an autonomous vehicle at point 205 that is not on the path 215 according to the disclosed methods and systems. A graft path 210 may be created to move the autonomous vehicle from point 205 to point 220 on path 215.

Figure 3:
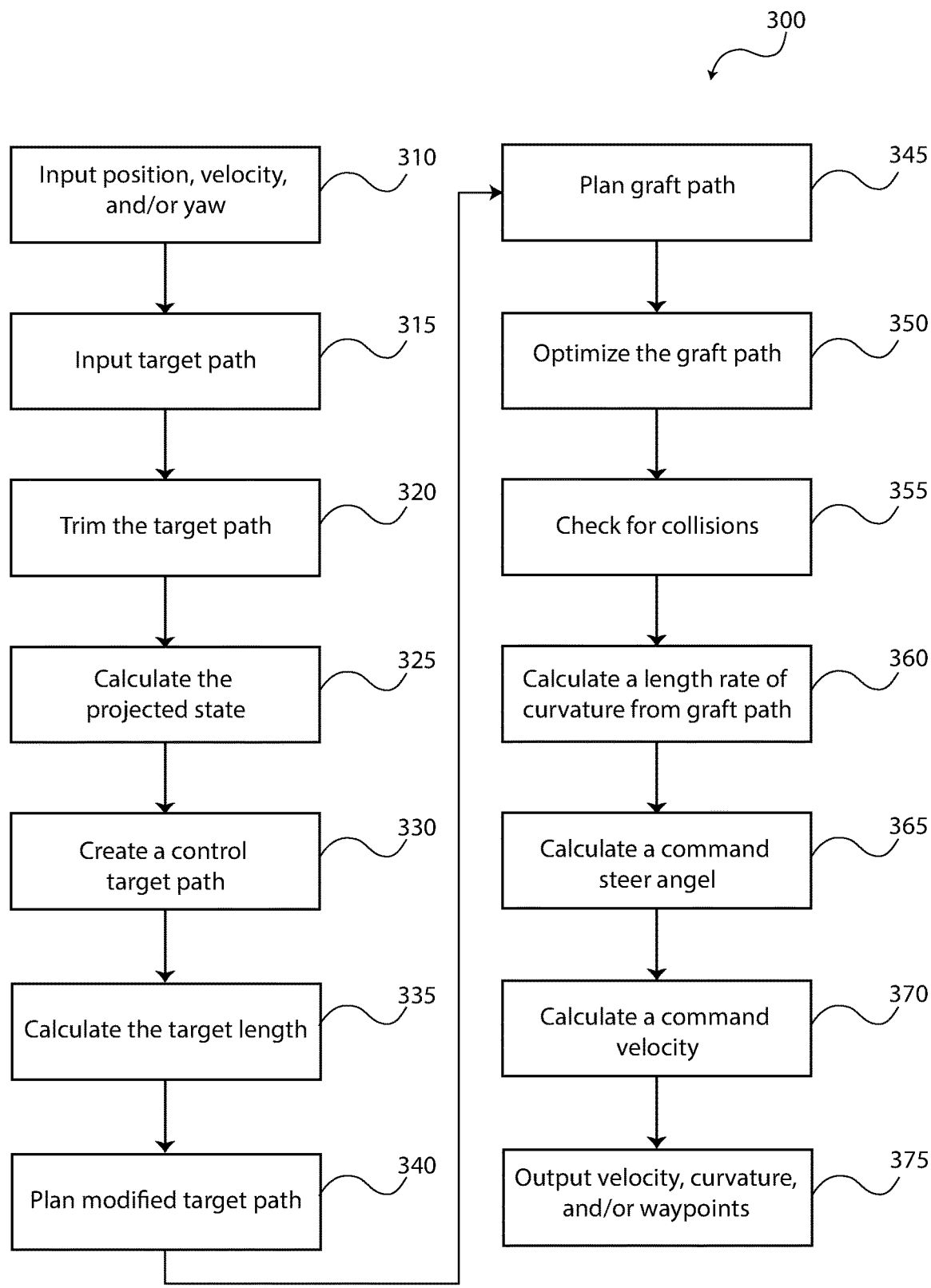
FIG. 3 is a flowchart of a process for controlling a path of an autonomous vehicle.

FIG. 3 is a flowchart of a process 300 for controlling a path of an autonomous vehicle. Process 300 may include any number of additional blocks between, before, or after any of the blocks shown in process 300. The blocks in process 300 may occur in any order. Any block in process 300 may be removed, skipped, or replaced.

Process 300 begins at block 310. At block 310 the process 300 may input the first position, the current velocity, and/or the current yaw of the autonomous vehicle. The first position may be reflected by the first position 405 shown in FIG. 4. The first position 405, for example, may include the current X, Y position of the center of mass (or the center of the rear axle) of the autonomous vehicle relative to a reference point within an environment. The environment, for example, may include a mine site, a quarry, a farm, a truck yard, a factory, a field, etc. The current velocity, for example, may be the autonomous vehicle's forward velocity as reflected by the vector 406 in FIG. 4. The current yaw, for example, may comprise the orientation of the center of the rear axle of the autonomous vehicle.

The position, velocity, and/or yaw of the autonomous vehicle, for example, can be used to update a linearized bicycle model or any similar model.

Figure 4:
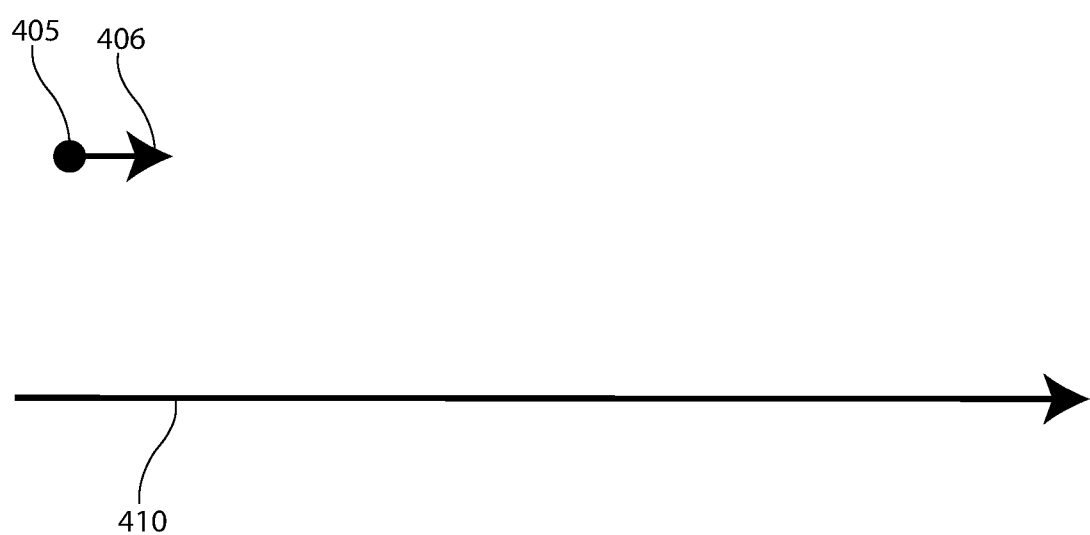
FIG. 4 is an illustration of an autonomous vehicle at point that is not on the path according to the disclosed methods and systems.

At block 315 the process 300 may input a target path such as, for example, target path 410. The target path 410, for example, may be the path that the autonomous vehicle is not currently on but should be on or the path the command and control software has instructed the autonomous vehicle to be on. As shown in FIG. 4, the first position is not located on the target path.

Figure 5:
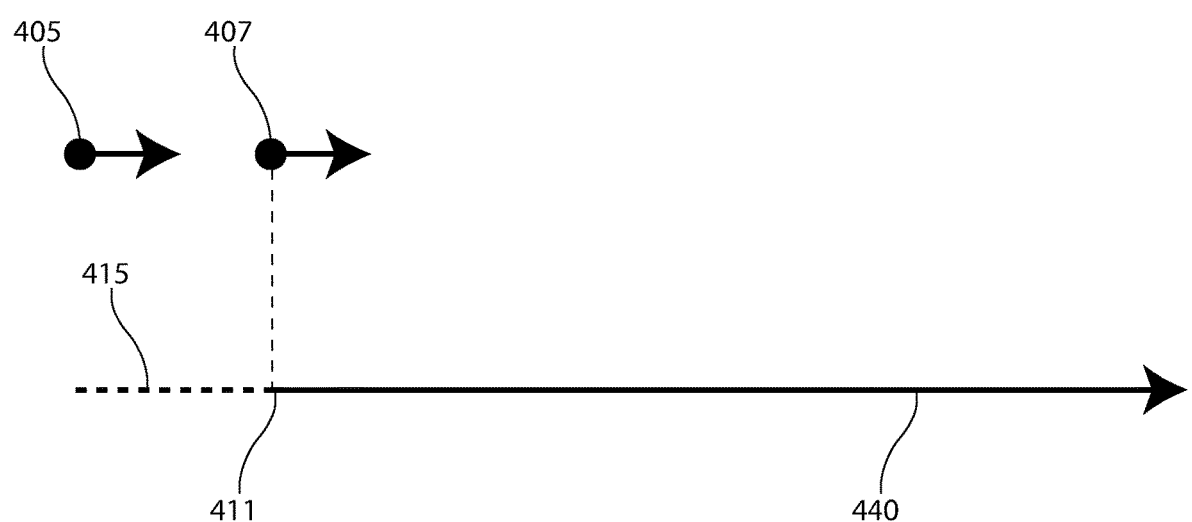
FIG. 5 is an illustration of a trimmed path.

At block 320 the target path 410 can be trimmed. For example, as shown in FIG. 4, if the autonomous vehicle has advanced from the first position 405 to a second position 407, the target path 410 may be trimmed as shown in FIG. 5. The target path 410, for example, may be trimmed so that any path elements prior to path point 411, which is a point perpendicular relative to the target path 410 at the second position 407, may be removed or trimmed from the target path 410. After trimming the target path 410, the trimmed off path portion 415, may not be considered part of the target path 410.

Figure 6:
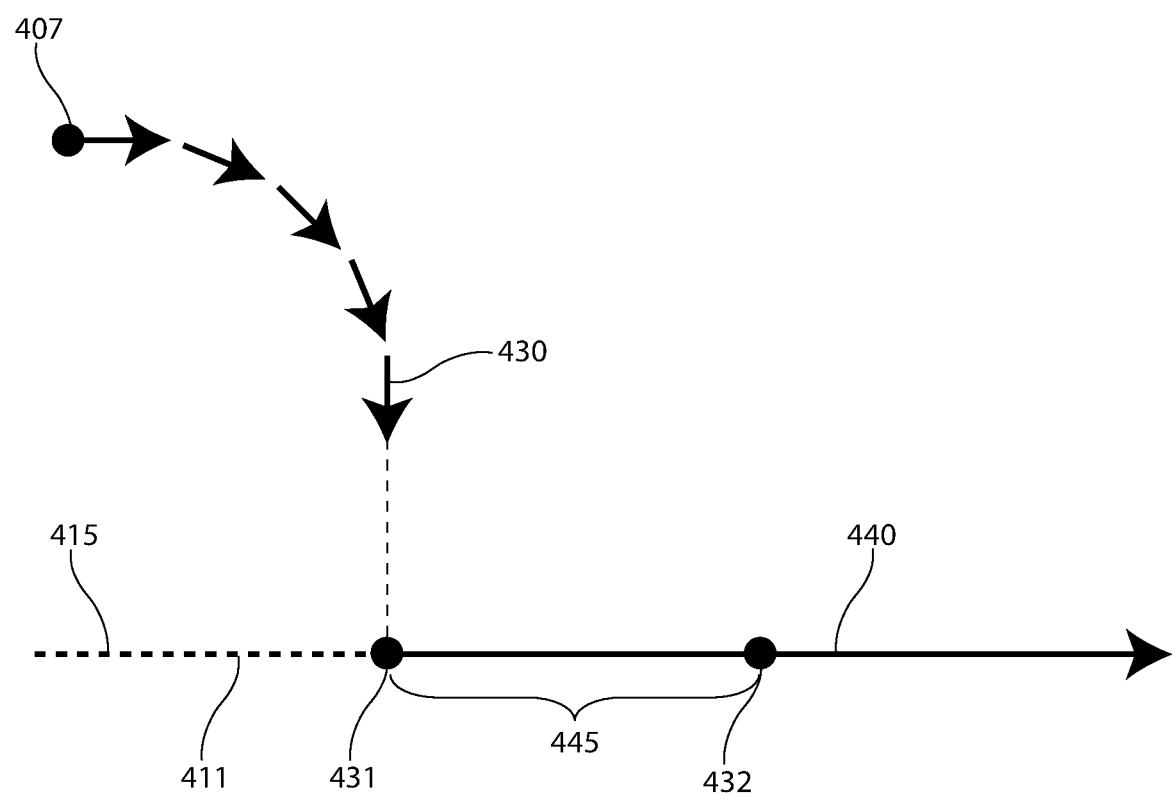
FIG. 6 is an illustration of a prediction of the location of an autonomous vehicle at the point that the next command.

At block 325, a history of future steering and/or speed commands (collectively or individually referred to as commands) may be stored in a buffer. The commands may include a plurality of commands with steering angles and/or speeds at specific times. The buffer, for example, may have a buffer size that is substantially the same size as the delay (or twice the delay) between when a command is issued and when the steering system responds. The commands may be simulated a plurality of times to compute a projected state of the autonomous vehicle, which may be referred to as the projected state 430 of the autonomous vehicle. The projected state 430, for example, as shown in FIG. 6, may be a prediction of where the autonomous vehicle will be at the point that the next command will have an effect and/or may be based on the various commands.

At block 330, a control target path 440 may be created from the target path 410. The control target path 440, for example, may be the target path trimmed using the projected state 430.

If the autonomous vehicle is on a reverse segment (i.e., a segment where the vehicle is driving in reverse), for example, then one or both of the control point (e.g., the center of the rear axle) and control target path 440, for example, may be recast to the reverse directions. This may, for example, allow the graft path planning phase (e.g., at block 345 and/or block 350) to be done with a control point that is always moving forward.

If at any time the projected state 430 has moved beyond the end of the target path the process 400 may end.

At block 335 the process 300 may calculate a target path length. The target path length, for example, may be calculated as the length from the point 431 on the control target path 440 to the end of the control target path 440. The point 431, for example, may be a point on the target path 440 perpendicular with the projected state 430. The point 431, for example, may be the shortest distance from the projected state 430 to the control target path 440. In addition, the portion of the control target path 440 prior to (e.g., to the left of point 431) may be trimmed.

The target path length, for example, may be calculated as the maximum of one of the following values: about 1 meter, the maximum turn radius of the autonomous vehicle, the off path lookahead of the autonomous vehicle, and the speed based lookahead distance.

FIG. 6 shows the target point 432, which may be on the control target path 440 and may be the target path length 445 from the point 431.

At block 340 the process 300 may plan a modified target path. The modified target path may be a path from the projected state 430 to the target point 432. The modified target path, for example, may include one or more clothoid segments from the projected state 430 to the target point 432.

Figure 7A:
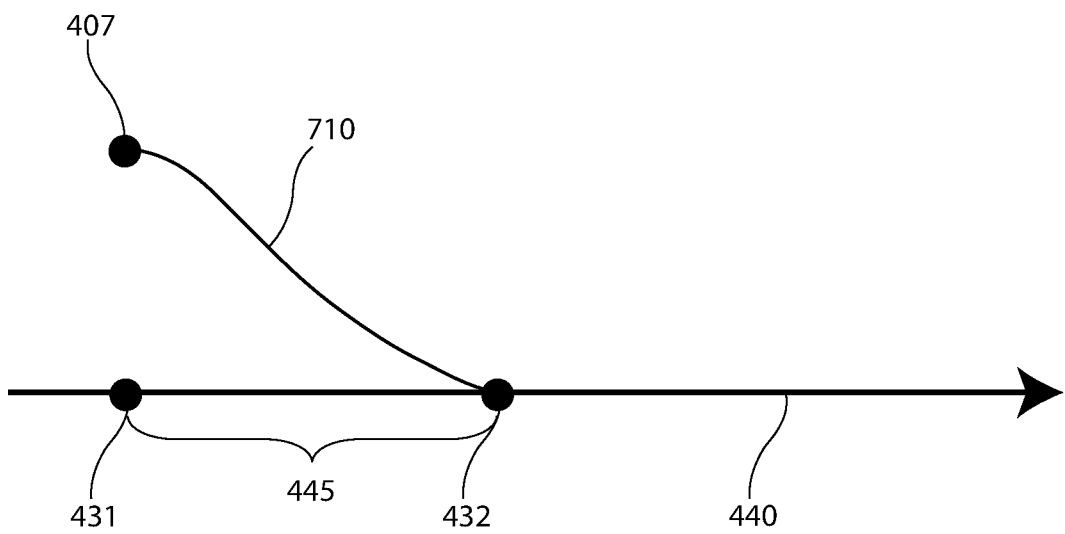
FIG. 7A and FIG. 7B illustrate example graft paths.
Figure 7B:
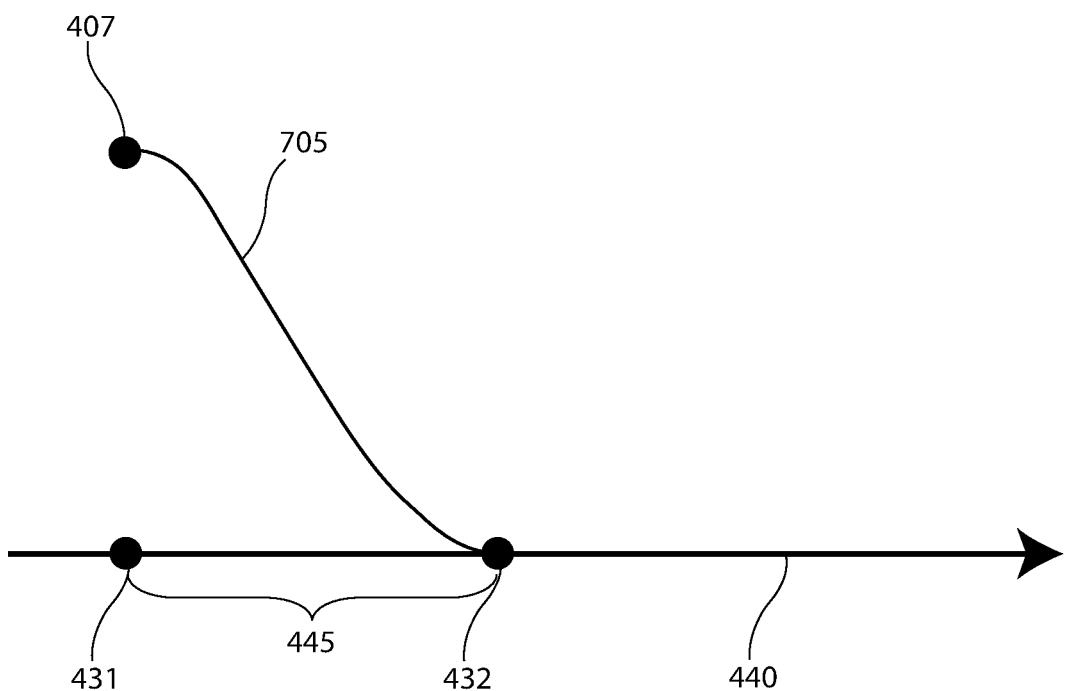

The modified target path, for example, may comprise a Dubin's path 705 (see FIG. 7A), a single clothoid path 710 (see FIG. 7B), or both a Dubin's path and a clothoid path. The Dubin's path 705 may include a two clothoids with a straight line in between.

A clothoid, for example, is a curve whose curvature changes linearly with the length of the curve. As another example, a clothoid is a two-dimensional path, defined to have constant change in curvature over the travel distance. A clothoid, for example, looks like a clock spring, with zero curvature at one end, and then coiling ever tighter at the other end. Arcs and line segments are special cases of a clothoid. In some examples, a circular arc may be a clothoid because it has a constant curvature (e.g., zero curvature change) and the curvature magnitude is inversely related to that circle's radius. In some examples, a straight line may be a clothoid, having both a no-curvature change, and a constant curvature of zero over its entire length.

A Dublin's path, for example, is the shortest curve that connects two points in the two-dimensional Euclidean plane (i.e., x-y plane) with a constraint on the curvature of the path and with prescribed initial and terminal tangents to the path, and an assumption that the vehicle traveling the path can only travel forward.

At block 345 the process 300 may plan a graft path. The graft path, for example, may be planned at 100%, 105%, 110%, 115%, 120%, 125%, 130%, etc. of the target path length. The graft path, for example, may include three clothoids. The graft path may have one or both of the following conditions: the graft path starts at the projected state (x, y, heading, curvature) and/or the graft path ends on the specified state of the modified target path (x, y, heading, curvature).

Figure 8A:
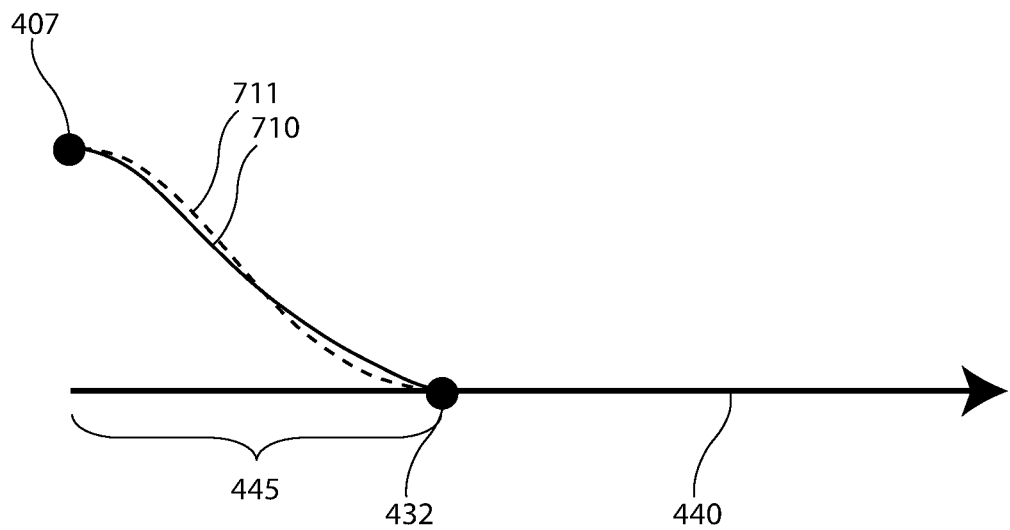
FIG. 8A and FIG. 8B illustrate example graft paths.
Figure 8B:
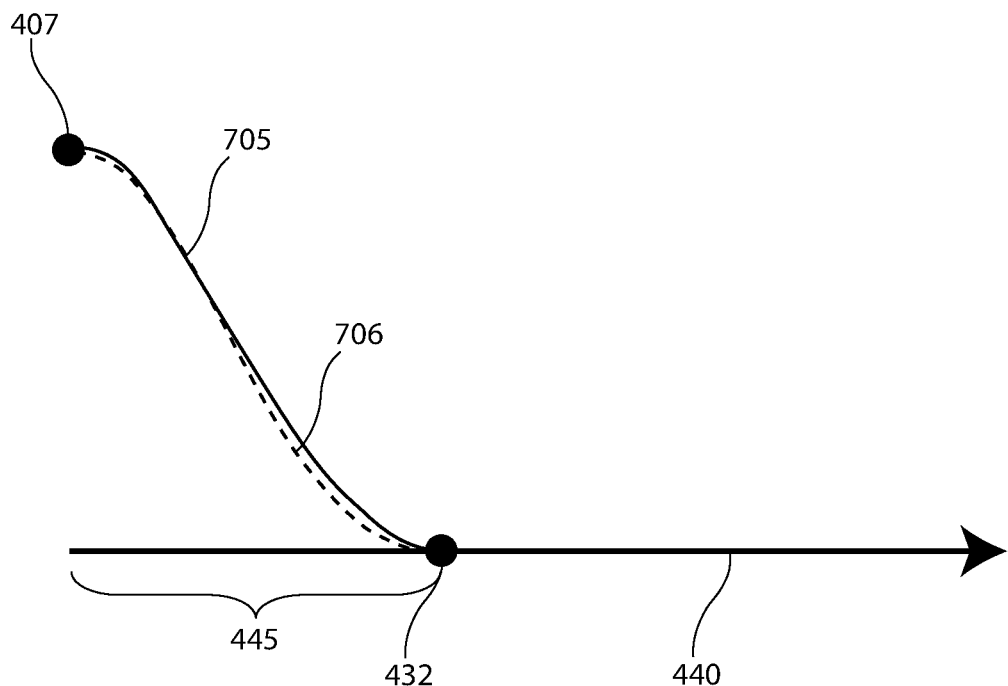

FIG. 8A illustrates a single clothoid graft path 710 and a three-segment clothoid 711 between the second position 407 and the target point 432. FIG. 8B illustrates single clothoid 705 and three-segment clothoid 706 between the second position 407 and the target point 432 for a second position 407 that is far from the control target path 440.

At block 350 the graft path may be optimized. The optimization, for example, may find the graft path that satisfies the following constraints and/or is as smooth as possible. For example, the smoothest path may be a path that minimizes max(dk0,dk1,dk2)-min(dk0,dk1,dk2) where dki is the delta curvature per length of the $i^{th}$ clothoid.

Figure 10:
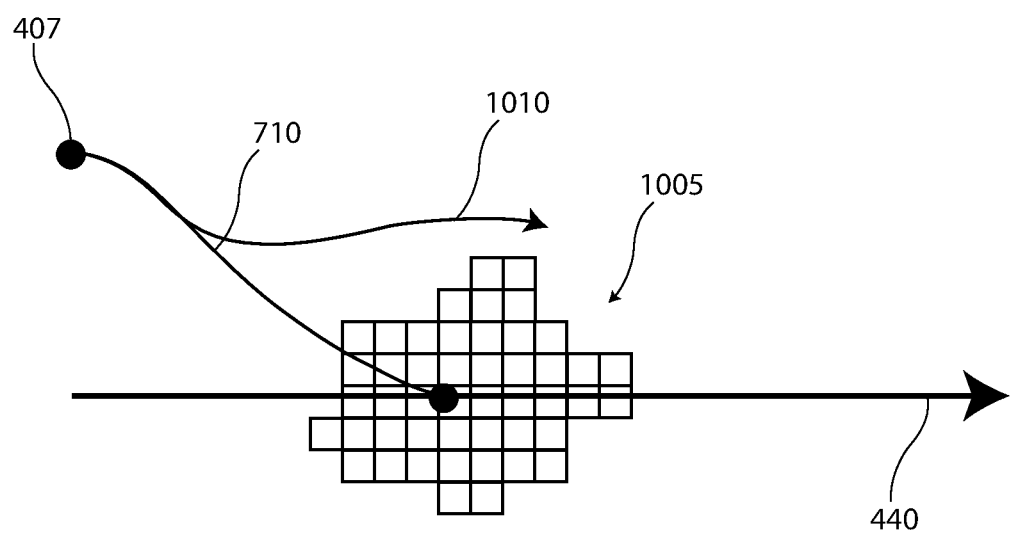
FIG. 10 is an illustration creating a graft path around an obstacle.

At block 355 the process 300 may check for potential collisions with obstacles. FIG. 10 is an example of obstacles 1005 on the control target path 440 and/or on the single clothoid graft path 710. Potential collisions with obstacles 1005, for example, may be tested at all points along the single clothoid graft path 710 (and/or for a distance along the modified target path following the graft path). If a collision is found then a route 1010 can be planned around the obstacle and the graft path can be recomputed (e.g., following the steps above) to attach to this re-routed path and the collision check repeated.

Potential collisions may be tested by comparing the graft path with an occupancy map that includes observed or known obstacles within the environment.

Figure 9:
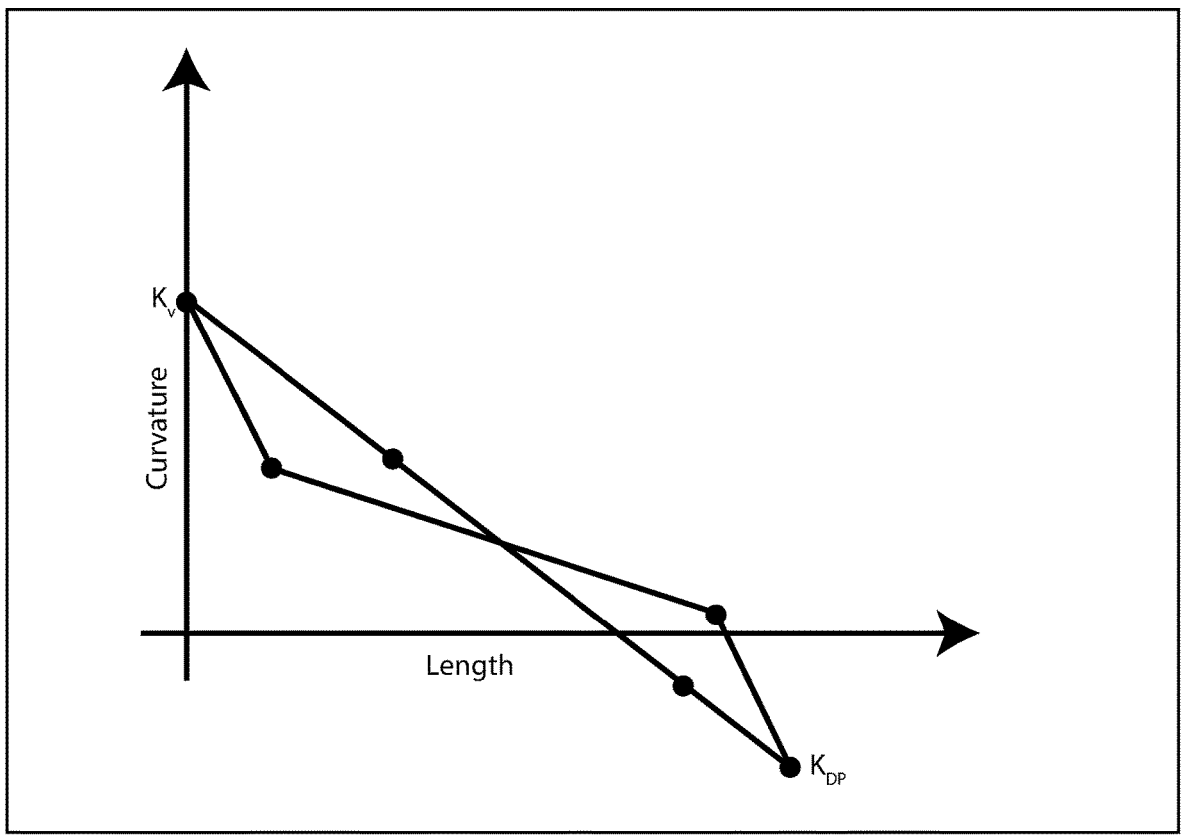
FIG. 9 is an illustration of the length rate of curvature from the graft path.

At block 360 the length rate of curvature from the graft path may be calculated. The length rate of the curvature, for example, may be the slope of the lines shown in FIG. 9 and/or may represent the tightness of a curve over a change of distance. The desired time rate of curvature may be extracted from the graft path, which may, for example, be max(speed, 0.2 m/s) times the length rate of curvature of the first non-zero length segment of the graft path. The graft path initial curvature may be calculated as the initial curvature of that segment.

At block 365 the command steer angle may be calculated. The command steer angle, for example, may be the tangent of the graft path initial curvature times the wheelbase (e.g., if the controller is in discrete mode), or the command steer angle may be the last calculated command steer angle (e.g., persisted) (e.g., if the vehicle is moving slower than the min steering speed).

Alternatively or additionally, the command steer angle may be determined using a steering model, a bicycle model, or a kinematic model to predict the vehicles motion given a command steer angle. The command steer angle, for example, may be calculated such that the average time rate of curvature of the simulated vehicle over the next delta time seconds (starting from the projected state) is equal to the desired time rate of curvature.

Alternatively or additionally, the command steer angle, may be a second order system. The command steer angle, for example, may include a delay, steer rate saturation, and/or steer value saturation.

At block 370 the process 300 may calculate the command velocity or the speed. The graft path, for example, may be used to calculate the command velocity. Alternatively or additionally, the command velocity may be limited to a speed that is slower than the max steering rate of the vehicle. Alternatively or additionally, the command velocity may be limited by a predetermined avoidance speed when obstacles are encountered (e.g., when dynamic avoidance is enabled). Alternatively or additionally, the command velocity may be limited one or more of a predetermined desired deceleration rate, a desired segment velocity, and/or a distance to the end of the graft path, which may be used to slow the vehicle down to the appropriate speed for each segment.

At block 375 one or more of the command speed, command steer angle, and/or a vector of waypoints, which may be used to visualize the graft path, may be output.

Any process or method disclosed in this document such as, for example, process 300, can be stored in a computer readable medium including compact disc read only memory (CDROM), random access memory (RAM), floppy disk, hard disk, and magneto-optical disk. The computer readable medium can include instructions that when executed by a computational system execute the method or process stored on the computer readable medium.

Figure 11:
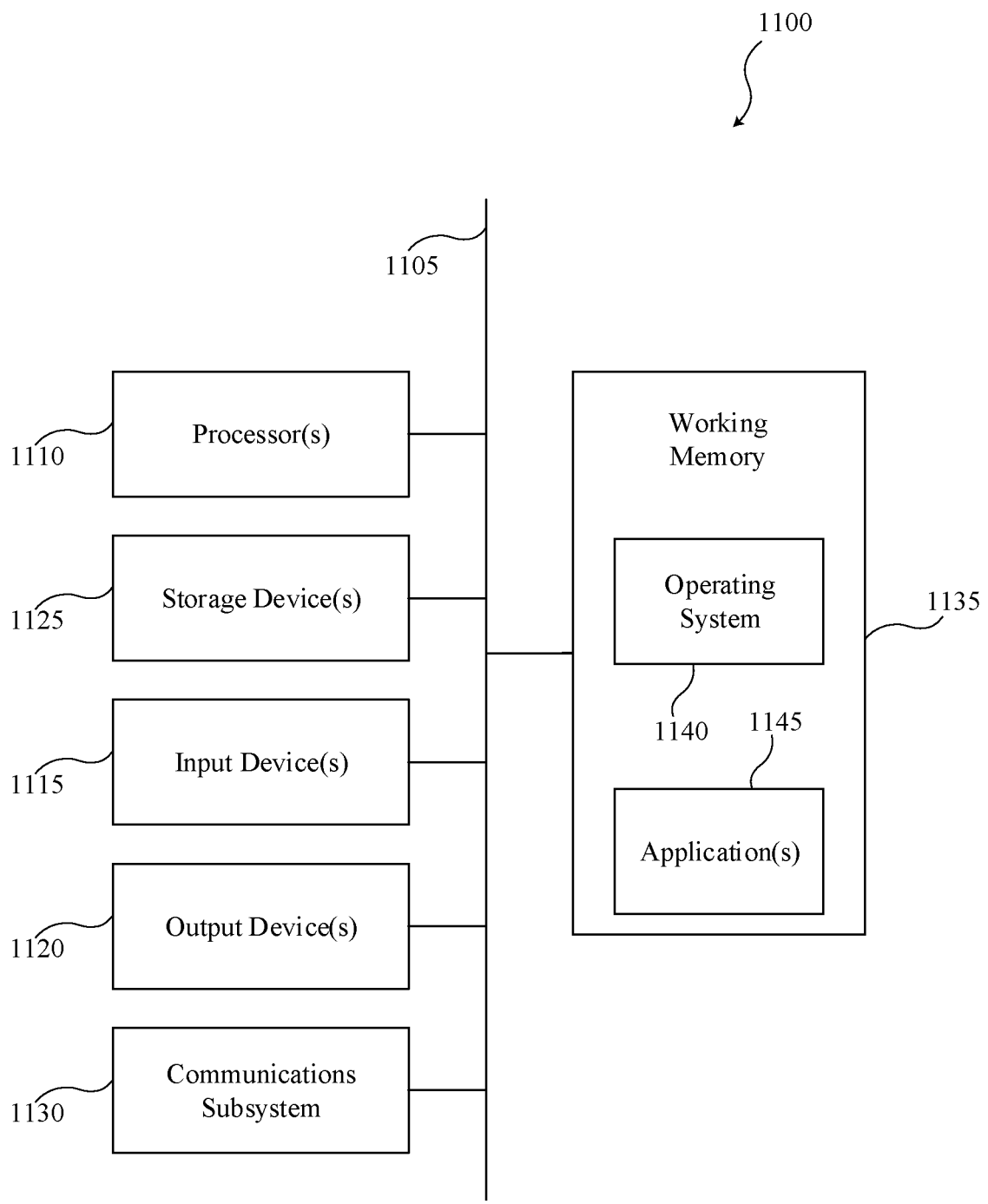
FIG. 11 is a block diagram of an example computational system.

The computational system 1100, shown in FIG. 11 can be used to perform any process or method disclosed in this document. For example, computational system 1100 can be used to execute process 300. As another example, computational system 1100 can perform any calculation, identification and/or determination described here. Computational system 1100 includes hardware elements that can be electrically coupled via a bus 1105 (or may otherwise be in communication, as appropriate). The hardware elements can include one or more processors 1110, including without limitation one or more general-purpose processors and/or one or more special-purpose processors (such as digital signal processing chips, graphics acceleration chips, and/or the like); one or more input devices 1115, which can include without limitation a mouse, a keyboard and/or the like; and one or more output devices 1120, which can include without limitation a display device, a printer and/or the like.

The computational system 1100 may further include (and/or be in communication with) one or more storage devices 1125, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1100 might also include a communications subsystem 1130, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 1130 may permit data to be exchanged with a network (such as the network described below, to name one example), and/or any other devices described in this document. In many embodiments, the computational system 1100 will further include a working memory 1135, which can include a RAM or ROM device, as described above.

The computational system 1100 also can include software elements, shown as being currently located within the working memory 1135, including an operating system 1140 and/or other code, such as one or more application programs 1145, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1125 described above.

In some cases, the storage medium might be incorporated within the computational system 1100 or in communication with the computational system 1100. In other embodiments, the storage medium might be separate from a computational system 1100 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1100 and/or might take the form of source and/or installable code, which, upon compilation and/or installation on the computational system 1100 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method for planning the path of an autonomous vehicle, the method comprising:
    receiving a first position, initial velocity, and/or yaw of the autonomous vehicle;
    receiving a target path along which the autonomous vehicle is expected to drive, wherein the first position is not on the target path;
    trimming the target path based on the first position of the autonomous vehicle;
    calculating a target path length of the target path;
    planning a modified target path based on the target path and the target path length;
    creating one or more graft paths from the first position to the modified target path;
    optimizing the one or more graft paths to produce a single graft path;
    determining a length rate of curvature from the single graft path;
    determining a command steer angle from the graft path;
    determining command velocity from the graft path; and
    outputting the command steer angle and the command velocity.

2. The method according to claim 1, wherein the command steer angle comprises a steer angle determined from a tangent of the graft path initial curvature times a wheelbase of the autonomous vehicle.

3. The method according to claim 1, wherein the command steer angle comprises a last calculated command steer angle.

4. The method according to claim 1, wherein the command velocity is less than a max steering rate of the autonomous vehicle.

5. The method according to claim 1, wherein the command velocity is less than a predetermined avoidance speed.

6. The method according to claim 1, wherein the length rate of curvature is determined from the maximum of the current speed times.

7. An autonomous vehicle comprising:
    a sensor array;
    an engine output control system;
    a braking control system;
    a steering control system,
    a communication system; and
    a controller communicatively coupled with the sensor array, the engine output control system, the transmission control system, the steering control system, and the braking control system, the controller configured to:

retrieve a first position, initial velocity, and/or yaw of the autonomous vehicle from the sensor array;

receive a target path for the autonomous vehicle wherein the first position is not on the target path;

trim the target path based on the first position of the autonomous vehicle;

calculate a target path length from the target path along which the autonomous vehicle is expected to drive;

plan a modified target path based on the target path and the target path length;

create one or more graft paths from the first position to the modified target path;

optimize the one or more graft paths to produce a single graft path;

determine a length rate of curvature from the single graft path;

determine a command steer angle from the graft path;

determine command velocity from the graft path;

output the command steer angle to the steering control system; and output the command velocity to the engine control system and/or the braking control system.

8. The autonomous vehicle according to claim 7, wherein the command steer angle comprises a steer angle determined from a tangent of the graft path initial curvature times a wheelbase of the autonomous vehicle.

9. The autonomous vehicle according to claim 7, wherein the command steer angle comprises a last calculated command steer angle.

10. The autonomous vehicle according to claim 7, wherein the command velocity is less than a max steering rate of the autonomous vehicle.

11. The autonomous vehicle according to claim 7, wherein the command velocity is less than a predetermined avoidance speed.

12. The autonomous vehicle according to claim 7, wherein the length rate of curvature is determined from the maximum of the current speed times.

13. A non-transitory computer-readable recording medium storing instructions for executing a method for planning the path of an autonomous vehicle, the method comprising:

receiving a first position, initial velocity, and/or yaw of the autonomous vehicle;

receiving a target path along which the autonomous vehicle is expected to drive wherein the first position is not on the target path;

trimming the target path based on the first position of the autonomous vehicle;

calculating a target path length of the target path;

planning a modified target path based on the target path and the target path length;

creating one or more graft paths from the first position to the modified target path;

optimizing the one or more graft paths to produce a single graft path;

determining a length rate of curvature from the single graft path;

determining a command steer angle from the graft path;

determining command velocity from the graft path; and outputting the command steer angle and the command velocity.

14. The non-transitory computer-readable recording medium according to claim 13, wherein the command steer angle comprises a steer angle determined from a tangent of the graft path initial curvature times a wheelbase of the autonomous vehicle.

15. The non-transitory computer-readable recording medium according to claim 13, wherein the command steer angle comprises a last calculated command steer angle.

16. The non-transitory computer-readable recording medium according to claim 13, wherein the command velocity is less than a max steering rate of the autonomous vehicle.

17. The non-transitory computer-readable recording medium according to claim 13, wherein the command velocity is less than a predetermined avoidance speed.

18. The non-transitory computer-readable recording medium according to claim 13, wherein the length rate of curvature is determined from the maximum of the current speed times.

* * * * *